United States Patent Office 3,369,906
Patented Feb. 20, 1968

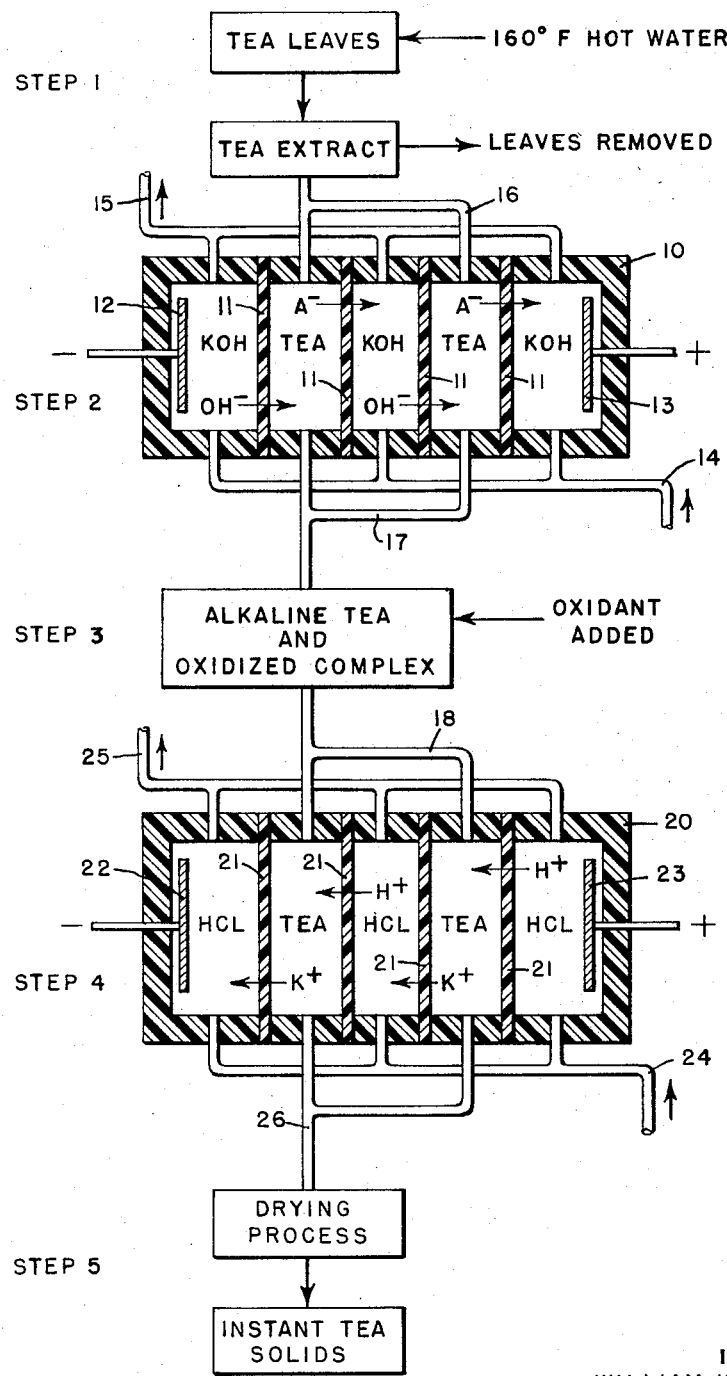

3,369,906
ELECTRODIALYTIC TREATMENT OF TEA
William Kwo-Wei Chen, Stamford, Conn., assignor to American Machine & Foundry Company, a corporation of New Jersey
Continuation of application Ser. No. 334,711, Dec. 31, 1963. This application Aug. 3, 1967, Ser. No. 658,293
3 Claims. (Cl. 99—77)

ABSTRACT OF THE DISCLOSURE

Electrodialytic treatment of tea without salt formation.

---

This application is a continuation of copending application Ser. No. 334,711 filed Dec. 31, 1963, and now abandoned.

This invention relates in general to electrodialysis apparatus and processes; and, more particularly, to fluid treatment processes and apparatus in which ions are displaced by electrodialysis.

An object of this invention is to provide an apparatus and a process for modifying the ion content of liquid foods while adjusting and controlling the pH of the resulting product.

Another object of this invention is to provide apparatus and a process for the modification of ion content of food products while preventing unwanted precipitation and membrane fouling in the apparatus.

A further object of this invention is to provide electrodialysis apparatus and process for the modification of ion content of fluids in which the precipitate dislodging and antifouling practice of current reversal may be carried out without need of hydraulic or fluid flow reversal.

Still another object of this invention is to provide an apparatus and a process for the treatment of tea concentrates to produce a less expensive instant tea.

Many other objects, advantages and features of invention reside in the combination and arrangement of parts involved in this invention and its practice as will be understood from the following description and accompanying drawing wherein:

The figure of the drawing is a schematic diagram showing five steps of the process of making instant tea according to this invention, the process including two steps using electrodialysis apparatus according to this invention, said apparatus being shown in section.

Referring to the drawing in detail, tea leaves are first treated with hot water at 160° F. to provide a hot tea extract from the infusion, from which the leaves are removed. This constitutes the first step of the process for making an instant tea that will rapidly dissolve in cold water.

This hot extract can then be made alkaline to facilitate oxidation in step 3 by addition of alkali or the tea extract may then be passed through an electrodialysis stack 10 having the anion permeable membranes 11 defining fluid treatment compartments within it. Electrodes 12 and 13 are disposed beyond the membranes 11 within stack 10. A pipe 14 introduces a dilute solution of potassium hydroxide, or other suitable base, into alternate fluid treatment compartments formed by the membranes 11. Pipe 15 removes the base from these compartments. Tea extract flows through pipe 16 to pass through the remaining alternate fluid treatment compartments and flows from them through pipe 17. As the tea passes through the fluid treatment compartments, hydroxyl ions pass through the anion permeable membranes from the base into the fluid treatment compartments containing tea extract. Anions in the tea extract pass into adjacent fluid treatment compartments and are removed with the base through pipe 15. Stack 10 is designed so that tea extract with a pH of 10 flows into pipe 17. This is the second step of this process.

Referring further to the drawing, an oxidant such as hydrogen peroxide, air, or oxygen is then added (step 3) to the alkaline tea extract. If desired, the alkaline tea extract may be exposed to air to oxidize it. The oxidant reacts to form a soluble complex in the alkaline tea extract, which complex will be later described. This constitutes the third step of this process.

Pipe 18 conducts the akaline tea extract and oxidized complex into the stack 20. Stack 20 contains the cation permeable membranes 21, which define fluid treatment compartments within it, and stack 20 also contains the electrodes 22 and 23, which are disposed beyond the membranes 21. Alternate fluid treatment compartments have a dilute hydrochloric, or other suitable, acid solution introduced into them through pipe 24 and withdrawn through pipe 25. Pipe 18 introduces the tea extract into the interspersed fluid treatment compartments from which the tea extract is drawn by pipe 26. As the tea extract passes through stack 20, hydrogen ions pass through the cation permeable membranes into the tea extract from the acid and cations within the tea extract pass through the membranes to enter the acid stream. In this manner the tea extract may be adjusted to have a pH of about 5 which is the normal pH of freshly brewed tea. This constitutes the fourth step of this process.

The fifth and final step of the process includes drying the tea extract to drive off all the water of solution and leave instant tea solids.

Processors of instant tea must produce a product which is readily soluble in cold water and which dissolves without any cloudy formation which detracts from the clear color of a good freshly brewed tea. The cloudy formation which often results with the use of instant teas in cold water has been traced to the formation of a tannin-caffeine complex. Removal of this complex may be accomplished by chilling the hot tea extract to precipitate the complex, but this results in a loss of up to about ten percent of the total tea solids if the precipitated portion is then discarded.

One conventional process for producing instant tea introduces a base after step one in place of step two as was hereinbefore described. The alkalizing of the hot tea extract prevents precipitation of the complex. However, the alkaline tea containing the complex must be adjusted in pH to that of brewed tea, i.e. to a pH of about 5. To adjust the pH of the alkaline tea, an acid must then be added. However, with the addition of an acid, a salt is formed which imparts a very undesirable taste in tea. Some processors have used and ion exchange resin column to remove the salt thus formed. This process, involving the use of a strong acid resin, presents many difficulties: a high solids solution must be flowed through a resin column causing hydraulic problems; there is a low resin life due to fouling; the resin is difficult to regenerate; and costly tea solids left in the column cannot be reclaimed without extensive dilution of the extract. The dilution of the extract is not desirable because the extract, after this treatment, must be dried and any dilution adds considerably to the cost of finally recovered tea solids.

In the process of the instant invention, as it has been described, no salt is formed. First the hydroxyl ions enter the tea concentrate stream without adding the cation of a base, then the hydrogen ions enter the tea concentrate stream without adding the anion of an acid. Thus only a small amount of water is formed by the hydrogen and hydroxyl ions so that, in place of an undesirable salt, only water is formed.

Thus it may be seen that the processing of tea according to this invention produces a superior product at a reduced cost.

While this invention has been described as applied to the production of instant tea, the use of an all anion membrane stack followed by an all cation permeable membrane stack has many advantages in other applications. In the use of two such stacks, one after the other, a benefit may be gained which could not be provided by the use of either stack alone or by the use of a more conventional system employing one stack of alternating anion and cation permeable membranes. First, unlike conventional electrodialysis apparatus, current fed to the electrodes 12 and 13 and 22 and 23 may be periodically reversed to prevent any build up of precipitates on the membrane 11 or 21. No accompanying fluid flow or stream reversal is required as it is in conventional stacks. In the treatment of certain solutions, it is advantageous to remove troublesome cations and render the solution acidic before subjecting the solution to anion permeable membranes with a tendency to form precipitates under alkaline conditions.

For example, salt may be removed from a stream of whey by passing it first through an electrodialysis stack 20. When direct current is passed through stack 20, all the cations migrate toward the cathode. Sodium, calcium, or any other cations present in the whey, are moved out of the whey stream through the membranes 21 into the acid stream. At the same time, hydrogen ions in the acid stream move into the whey stream. The acidified whey is then passed through an electrodialysis stack 10 so that unwanted anions, such as chlorine, sulfate, and the like, can be replaced with hydroxyl ions. These unwanted anions are moved under the influence of direct current toward the anode and they migrate through the anion permeable membranes 11 into a basic stream as hydroxyl ions move from the basic stream into the whey.

In this process for removing salt from whey, it is not necessary to place stack 10 directly after stack 20. The stacks 20 and 10 can be utilized in separate operations and the two stacks need not be of the same size or configuration. For example, if acidic whey is to be treated, stack 10 should carry more current than stack 20.

If a solution being treated is sensitive to high acidity or alkalinity, such as an inversion-sensitive sugar catalyzed by an acid or a base, or a milk or an industrial emulsion which is subjected to coagulation by excessive amounts of acid or base, the solution being treated can pass through many successive stages of stacks 10 and 20 in series, each stack displacing a fraction of the ions. Further, the fluid treatment compartments of the electrodialysis stacks 10 and 20, which carry the food product or the like being treated, may be relatively open and unobstructed and larger than the acid or base containing compartments. This allows viscous and solids-bearing solutions to readily pass through the stacks. Solutions such as molasses and citrus juice may thus be treated in the electrodialysis stacks of the instant invention whereas these solutions and sludges are difficult to put through ion exchange resin columns. Finally, by adjusting the current flowing to the electrodes in stacks 10 and 20, the amount of acid and base exchanged can be individually and independently adjusted. This results in a net change of pH which is difficult to achieve and control in the case of conventional apparatus.

This invention may be used in conjunction with conventional electrodialysis apparatus. It may be used to modify the ion content of hard and saline water, milk, whey, sugar solutions, molasses, fruit juices, wine, liquid foods, paint emulsions, sulphite pulp, sewage, and other solutions and wastes.

What is claimed is:

1. In the displacing of ions from a solution of tea by passing the solution through fluid treatment compartments of at least two electrodialysis stacks without salt formation, the process comprising the steps of first passing the solution of tea through one stack having anion permeable membranes defining fluid treatment compartments while passing hydroxyl ions into each of the fluid treatment compartments from a base solution disposed adjacent the stacks having anion permeable membranes and secondly passing the solution of tea through another stack having cation permeable membranes defining fluid treatment compartments while passing hydrogen ions into each of the fluid treatment compartments from an acid solution disposed adjacent the stack having cation permeable membranes.

2. The process of displacing ions from a solution of tea comprising the steps of first passing the solution through the fluid treatment compartments of a first electrodialysis stack having anion permeable membranes defining the fluid treatment compartments and having base solution disposed adjacent to the fluid treatment compartments while permitting hydroxyl ions to enter the solution and anions to leave the solution through the anion permeable membranes to make the solution basic; and secondly passing the basic solution of tea through the fluid treatment compartments of a second electrodialysis stack having cation permeable membranes defining the fluid treatment compartments and having an acid solution disposed adjacent to the fluid treatment compartments while permitting hydrogen ions to enter the solution and cations to leave the solution through the cation permeable membranes to bring the solution to a desired pH without salt formation.

3. The process of making tea concentrate comprising the steps of preparing an infusion of tea leaves in hot water, and removing the leaves to form an aqueous tea extract, passing the tea extract through an electrodialysis stack having fluid treatment compartments formed by anion permeable membranes and having a basic solution disposed adjacent the fluid treatment compartments and disposed between the fluid treatment compartments and passing hydroxyl ions into the fluid treatment compartments to alkalize the tea extract without salt formation, oxidizing the alkalized tea extract, secondly passing the oxidized tea extract through an electrodialysis stack having fluid treatment compartments formed by cation permeable membranes and having an acidic solution disposed adjacent the fluid treatment compartments and disposed between the fluid treatment compartments and passing hydrogen ions into the fluid treatment compartments to control the pH of the tea extract without salt formation and removing at least some of the water of the solution from the tea extract, leaving tea concentrate.

References Cited

UNITED STATES PATENTS

| | | | |
|---|---|---|---|
| 3,163,539 | 12/1964 | Barch | 99—77 |
| 3,165,415 | 1/1965 | Kilburn et al. | 99—105 |

FOREIGN PATENTS 617,371  3/1961  Canada.

OTHER REFERENCES

Katz, W. E., "Chemical Engineering Progress," vol. 53, No. 4, April 1957, pp. 190–193.

MAURICE W. GREENSTEIN, *Primary Examiner.*

A. LOUIS MONACELL, *Examiner.*